United States Patent [19]

Cook et al.

[11] Patent Number: 5,238,999

[45] Date of Patent: Aug. 24, 1993

[54] ENVIRONMENTAL ETCH RESISTANT, ONE-COMPONENT, COATING COMPOSITION, METHOD OF COATING THEREWITH, AND COATING OBTAINED THEREFROM

[75] Inventors: Vincent C. Cook, Southfield; James R. Eshelman, Howell; Edward A. Guerrini, West Bloomfield, all of Mich.

[73] Assignee: BASF Corporation, Southfield, Mich.

[21] Appl. No.: 913,562

[22] Filed: Jul. 14, 1992

Related U.S. Application Data

[63] Continuation-in-part of Ser. No. 752,033, Aug. 29, 1991, Pat. No. 5,137,972.

[51] Int. Cl.$^5$ .............................................. C08G 18/80
[52] U.S. Cl. ...................................... 525/124; 525/424; 525/440; 525/457; 525/458; 427/388.1; 427/388.2; 428/422.8
[58] Field of Search ............... 525/124, 424, 440, 457, 525/458; 427/388.1, 388.2; 428/422.8

[56] References Cited

U.S. PATENT DOCUMENTS

| | | | |
|---|---|---|---|
| 4,442,145 | 4/1984 | Probsh et al. | 525/124 |
| 4,532,300 | 7/1985 | Leny et al. | 525/124 |
| 4,920,008 | 4/1990 | Barbee | 525/124 |

Primary Examiner—Maurice J. Welsh
Attorney, Agent, or Firm—Anne Gerry Sabourin

[57] ABSTRACT

A one component composition suitable for coating a substrate, including at least one crosslinker having a functionality thereon that is reactive with a functionality on at least one film forming polymer. The crosslinker includes at least one member selected from the group consisting of: blocked isocyanurates of isophorone diisocyanate; derivatives of blocked isocyanurates of isophorone diisocyanate; blocked biurets of isophorone diisocyanate; derivatives of blocked biurets of isophorone diisocyanate. The composition preferably includes a blend of this crosslinker with a second crosslinker, wherein the second crosslinker is at least one member selected from the group consisting of: blocked isocyanurates of hexamethylene diisocyanate; derivatives of blocked isocyanurates of hexamethylene diisocyanate; blocked biurets of hexamethylene diisocyanate; and derivatives of blocked biurets of hexamethylene diisocyanate. The invention also pertains to a process for coating a substrate using the composition, as well as to a cured coating formed by the process of the present invention.

25 Claims, No Drawings

ENVIRONMENTAL ETCH RESISTANT, ONE-COMPONENT, COATING COMPOSITION, METHOD OF COATING THEREWITH, AND COATING OBTAINED THEREFROM

CROSS REFERENCE TO RELATED APPLICATION

This application is a continuation in part of Ser. No. 752,033 filed Aug. 29, 1991, now U.S. Pat. No. 5,137,972, which is hereby incorporated by reference.

BACKGROUND OF THE INVENTION

1. Field of the Invention

The present invention pertains to the field of coatings, more specifically to polymers crosslinked with blocked isocyanurates or blocked biurets of diisocyanates. The present invention pertains especially to automotive clearcoats including polymers crosslinked with blocked isocyanurates or blocked biurets of diisocyanates.

2. Background of the Invention and Material Information

In the field of automotive coatings, it has become an objective to obtain a clearcoat (i.e., the outermost automotive coating) that is resistant to being etched by environmental fallout. Environmental etching is manifested by pitting, water spotting or chemical spotting of the coating or any combination of these. Etch resistance is desirable because it improves the appearance and useful life of the coating.

Etch resistance can be measured by visual examination of the coating, or by a profilometer or by subjecting a coating on a test panel to a saline solution in a temperature gradient oven test. Etch resistance is generally measured by visual examination by individuals skilled at examining finishes for the degree of etch therein. Etch resistance has become more important as the amount of acid rain, and other industrial fallout has increased. Currently, environmental etching of automotive finishes is generally greatest in the areas most greatly affected by industrial fallout.

In addition to testing for resistance to environmental etching, automotive coatings are typically tested for resistance to damage from: exposure to ultraviolet radiation emitted from an ultraviolet emitting light bulb, exposure to ultraviolet radiation emitted from a xenon arc bulb, exposure to sunlight in regions differing in latitude, climate, and pollutant levels, exposure to high relative humidity at high temperature, and impacts made by small, hard objects.

Accordingly, it is most preferable to produce a coating having an optimum mix of characteristics with regard to all of the tests described above. In order to be commercially successful, a coating should test favorably in as many testing situations as possible. The sum of all of the characteristics of any particular coating determine its value in the real world of automotive coatings.

It is also desirable, in the manufacture and use of automotive coating formulations, to select compounds in order to minimize environmental impact and the expense involved in recovery thereof, and to utilize compounds that do not present an unacceptable risk to occupational safety or occupational health.

Clearcoat compositions used in the automotive industry are generally one component or two component compositions. A one component composition contains all ingredients of the composition in a single solution or dispersion. The one component composition forms films that can be cured via merely heating, without the use of any other solution or dispersion.

In contrast, a two component composition requires that two solutions or dispersions be mixed together to form the composition. Generally, once the solutions or dispersions are combined the composition is applied to the substrate as quickly as possible. Typically the components are mixed together immediately upstream of the nozzle of a sprayer and the mixture is immediately atomized by the nozzle into a mist that is directed at a substrate to form a film of the coating on the substrate.

Currently the most prevalent clear coat compositions utilized in the automotive industry are one-component clearcoat compositions. This is because most manufacturers employ paint booths designed for one component coating compositions. The most commonly used one coat compositions are melamine cure compositions. These compositions do not require that two or more reactive solutions or dispersions be mixed immediately before being applied to a substrate to be coated. These compositions crosslink upon exposure to heat in the presence of catalysts, and can be applied as one component compositions because they do not react until they are exposed to relatively high temperatures in the presence of a suitable catalyst.

However, one component compositions that comprise melamine are not without their disadvantages. It has been found that cured automotive clearcoats made using these compositions exhibit unsatisfactory environmental etch characteristics.

An alternative to the melamine cure, one component coating compositions, are one component compositions utilizing crosslinkers that include a blocked isocyanate functionality in combination with a film forming polymer. The term "blocked isocyanate" refers to the fact that the isocyanate reactive functionality —NCO— is reacted with a blocking agent. Preferred blocking agents are the oximes. Other blocking agents include suitable aliphatic, cycloaliphatic, aromatic, alkyl and aromatic-alkyl monoalcohols. Additional blocking agents are phenols and substituted phenols where the substituents do not adversely affect the coating operations. Useful amine blocking agents include dibutyl amine and tertiary hydroxyl amines. The blocking agent prevents the —NCO— functionality from reacting with a reactive functionality on the polymer until the composition is heated to a temperature at which the blocking agent volatilizes (deblocking temperature). When the blocking agent volatilizes, the reactive —NCO— functionality on the crosslinker can then react with a reactive functionality on the polymer. The film forming polymer has at least one functional group reactive with an isocyanate functionality.

To form the coating, the crosslinker comprising the blocked isocyanate functionality is combined with the polymer and a liquid carrier in which the crosslinker and polymer dissolve and/or disperse. The resulting mixture must be stored at a temperature below the deblocking temperature so that the crosslinker cannot react with the polymer. The deblocking temperature typically ranges from 135° C. to 155° C. The one component mixture can be sprayed onto a substrate so that a film of the composition is formed on the substrate. The film of the mixture on the substrate is thereafter heated in an oven so that the blocking agent "deblocks" (i.e., is released), whereby the isocyanate is free to react with the polymer. The reaction of the isocyanate with the polymer results in the production of a crosslinked polymer network, i.e., a cured coating.

One component coating compositions comprising a blocked isocyanate typically use only a blocked isocyanurate of hexamethylene diisocyanate. The blocked isocyanurate of hexamethylene diisocyanate is known to be advantageous for this use because it produces a coating having a good hardness to flexibility ratio. The blocked isocyanurate of hexamethylene diisocyanate is one of a few isocyanurates that are soluble or dispersible in the solvents and dispersants used in making coatings. Furthermore, the blocked isocyanurate of hexamethylene diisocyanate is a relatively inexpensive component in comparison to other isocyanurates.

An alternative blocked isocyanurate for use in the one component coating compositions is a blocked isocyanurate of diisophorone diisocyanate. However, there are several problems with this crosslinking agent including decreased mar resistance and brittleness, due to the very hard coatings that result. Also, these coatings tend to degrade and crack upon exposure to ultraviolet radiation. There has also been a problem of yellowing in clear coat compositions utilizing these crosslinkers, making then suitable for clearcoat applications over only a dark basecoat.

The composition, process, and coating of the present invention are novel in that they are more etch resistant and mar resistant and they overcome problems of yellowing, brittleness and degradation usually encountered with coatings containing blocked isocyanurates of isophorone diisocyanates.

SUMMARY OF THE INVENTION

The composition of the present invention is a one component composition suitable for coating a substrate. In one embodiment of the invention, the composition utilizes a crosslinker that includes at least one member selected from the group consisting of: blocked isocyanurates of isophorone diisocyanate, derivatives of blocked isocyanurates of diisophorone diisocyanate, blocked biurets of isophorone diisocyanate, and derivatives of blocked biurets of isophorone diisocyanate.

The composition of the present invention also includes a film forming polymer comprising at least one reactive polymer functionality, i.e., a functionality that is reactive with one or more functional groups present on the crosslinker(s).

It has been unexpectedly discovered that coating compositions containing blocked isocyanurates of isophorone diisocyanate as crosslinkers result in a coating exhibiting significantly improved environmental etch resistance when compared to coatings produced using other crosslinkers. It has also unexpectedly been discovered that the composition and process of the present invention significantly reduce yellowing of the cured clearcoat on a substrate. Yellowing of the cured clearcoat is reduced and etch resistance is maximized by curing the coating composition at a temperature of between about 143° C. and about 150° C.

In a second embodiment, the coating composition of the present invention preferably utilizes a second crosslinker in mixture with the crosslinker described above. The second crosslinker includes at least one member selected from the group consisting of: blocked isocyanurates of hexamethylene diisocyante, derivatives of blocked isocyanurates of hexamethylene diisocyanate, blocked biurets of hexamethylene diisocyanate and derivatives of blocked biurets of hexamethylene diisocyanate. The mixture of a first crosslinker and a second crosslinker provides unexpected improvements in the resultant coating. These improvements include improved resistance to: environmental etching, degradation caused by exposure to ultraviolet radiation emitted from an ultraviolet emitting light bulb, degradation caused by exposure to ultraviolet radiation emitted from a xenon arc bulb, degradation caused by exposure to sunlight in regions differing in latitude, climate, and pollutant levels, degradation caused by high relative humidity at high temperatures, and damage from impacts made by small, hard objects.

Further disclosed is a process for coating a substrate. In general, this process comprises applying the one component composition of the present invention described herein above to a substrate, so that a film is formed on the substrate, and subsequently curing the film, whereby a cured coating is produced on the substrate.

The present invention also relates to a cured coating on a substrate. The cured coating can be produced by using the composition of the present invention in the process as set forth in the preceding paragraph. The cured coating includes a crosslinked polymeric network, that includes at least one polymeric residue and at least one crosslinker residue. Preferably the coating of the present invention includes a mixture of a first crosslinker residue and at least one additional different crosslinker residue in combination with the polymeric residue. The polymeric residue and the crosslinker residues are further described in the preferred embodiment.

The one component coating composition containing at least one blocked crosslinker, set forth in the present invention, demonstrates improved performance over other one component coating compositions in resistance to environmental etching and damaging effects from sunlight and humidity, as well as resistance to marring and impact from small hard objects. The coating has improved gloss and distinctness of image. The present invention provides a one component composition suitable for forming an automotive grade coating.

DETAILED DESCRIPTION OF THE PREFERRED EMBODIMENTS

The coating composition of the present invention is a one-component composition. The composition includes at least one blocked crosslinker and a film forming polymer. The blocked crosslinker is the reaction product of an organic polyisocyanate and a blocking agent. The blocking agent is described herein below. The blocking agent prevents the —NCO— functionality of the crosslinker from reacting with a reactive functionality on the polymer until the composition is heated to a temperature at which the blocking agent volatilizes (deblocking temperature). When the blocking agent volatilizes, the reactive —NCO— functionality on the crosslinker can then react with a reactive functionality on the polymer.

In a first embodiment of the present invention, the composition includes a blocked isocyanurate crosslinker. This crosslinker is formed by reacting a blocking agent with an organic polyisocyanate that is selected from the group consisting of: isocyanurates of isophorone diisocyante, derivatives of isocyanurates of isophorone diisocyanate, biurets of isophorone diisocyanate and derivatives of biurets of isophorone diisocyanate.

The structure of the isocyanurate of isophorone diisocyanate has the formula:

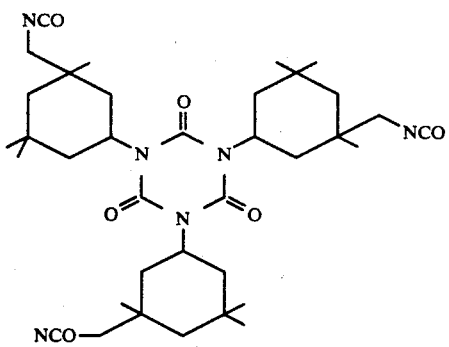

The phrase "a derivative of an isocyanurate of isophorone diisocyanate" refers to any derivative of the above described isocyanurate of isophorone diisocyanate, where the derivative can also act as a crosslinker to crosslink the film forming polymer. Such derivatives could include, for example, an acid functional derivative of the isocyanurate of isophorone diisocyanate and an epoxy functional derivative of the isocyanurate of isophorone diisocyanate, among other possible derivatives.

A biuret of isophorone diisocyanate is similar to the isocyanurate of isophorone diisocyanate, except that it lacks the central ring present in all isocyanurate structures. The biuret of isophorone diisocyanate has the following structure:

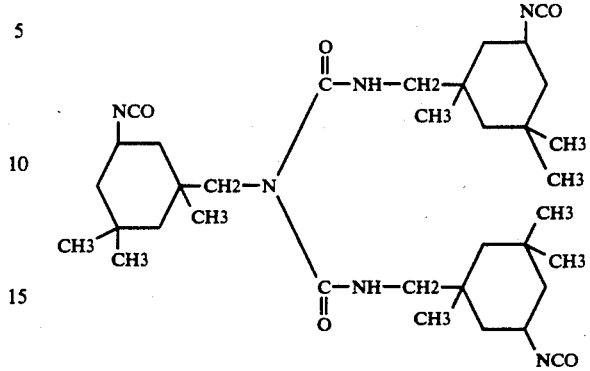

As used herein, the phrase "a derivative of a biuret of isophorone diisocyanate" refers to any derivative of the above described biuret of isophorone diisocyanate, where the derivative can also act as a crosslinker to crosslink the film forming polymer. Such derivatives could include, for example, an acid functional derivative of the biuret of isophorone diisocyanate having the formula:

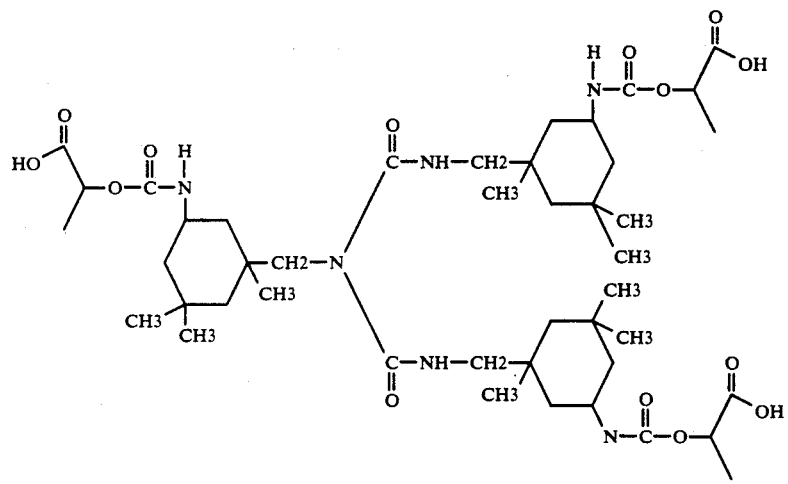

and an epoxy functional derivative of the biuret of isophorone diisocyanate, having the formula:

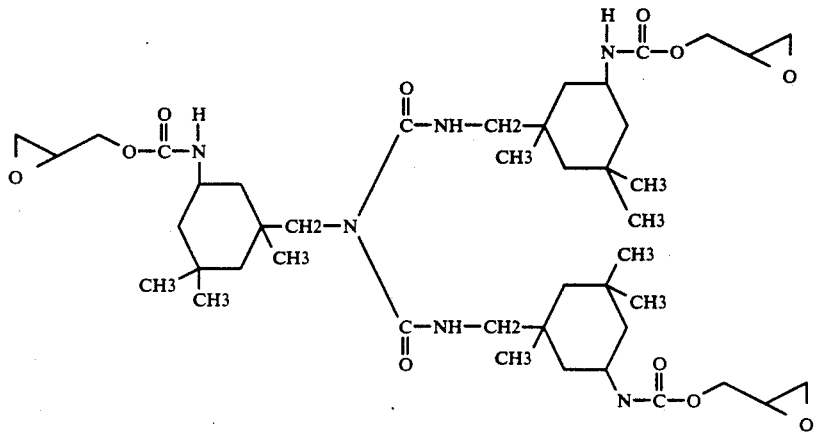

among other possible derivatives.

In a second embodiment, the composition of the present invention comprises a blend of at least a first blocked crosslinker and a second blocked crosslinker. The first crosslinker is as described above. The second blocked crosslinker is formed by reacting a blocking agent with organic polyisocyanate including isocyanurates of hexamethylene diisocyanate, derivatives of hexamethylene diisocyanate, biurets of hexamethylene diisocyanate and derivatives of biurets of hexamethylene diisocyanate, The isocyanurate of hexamethylene diisocyanate has the following structure:

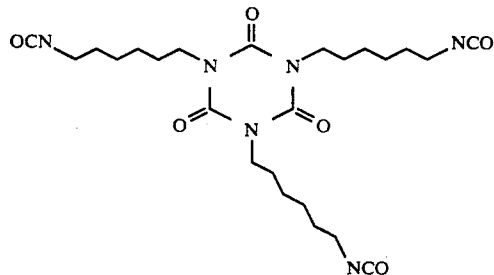

As used herein, the phrase "a derivative of an isocyanurate of hexamethylene diisocyanate" refers to any derivative of the above-described isocyanurate of hexamethylene diisocyanate, where the derivative can also act as a crosslinker to crosslink the film forming polymer. Such derivatives could include, for example, an acid functional derivative having the formula:

of the isocyanurate of hexamethylene diisocyanate and an epoxy functional derivative of the isocyanurate of hexamethylene diisocyanate having the formula

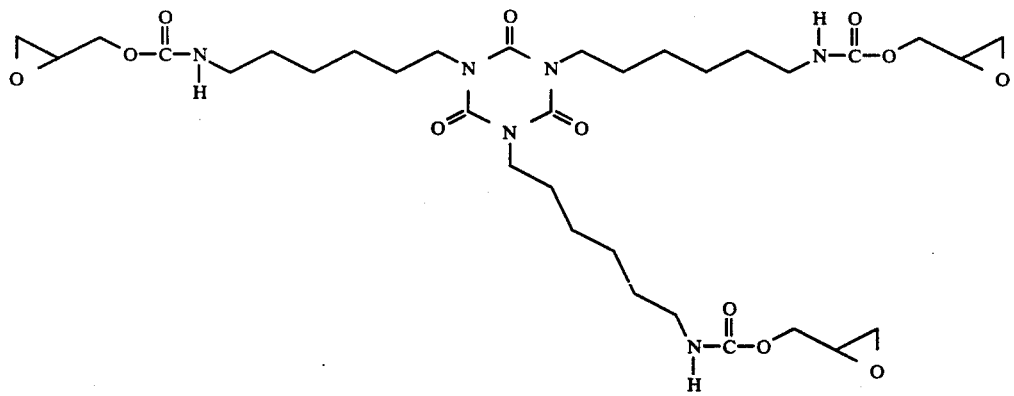

among other possible derivatives.

A biuret of hexamethylene diisocyanate is similar to the isocyanurate of hexamethylene diisocyanate, except that it lacks the central ring present in all isocyanurate structures. The biuret of hexamethylene diisocyanate has the following structure:

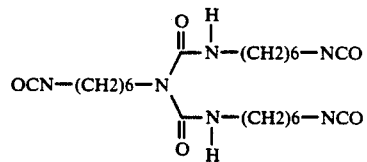

The blocked crosslinkers of the present invention are formed by reacting the above described diisocyanates with a blocking agent. Preferable blocking agents are oximes, such as methylethyl ketoxime, methyl-n-amyl ketoxime, acetone oxime, cyclohexanone oxime and caprolactam. Other blocking agents include any suitable aliphatic, cycloaliphatic, aromatic and alkyl monoalcohols. Additional blocking agents include the lower aliphatic alcohols such as methyl, ethyl, chloroethyl, propyl, butyl, amyl, hexyl, heptyl, octyl, nonyl, 3,3,5-trimethylhexanol, decyl and lauryl alcohols, and the like. Examples of aromatic-alkyl alcohols, include phenylcarbinol, ethylene glycol monoethyl ether, monobutyl ether, monopropyl ether and the like. Other blocking agents are phenolic compounds such as phenol itself

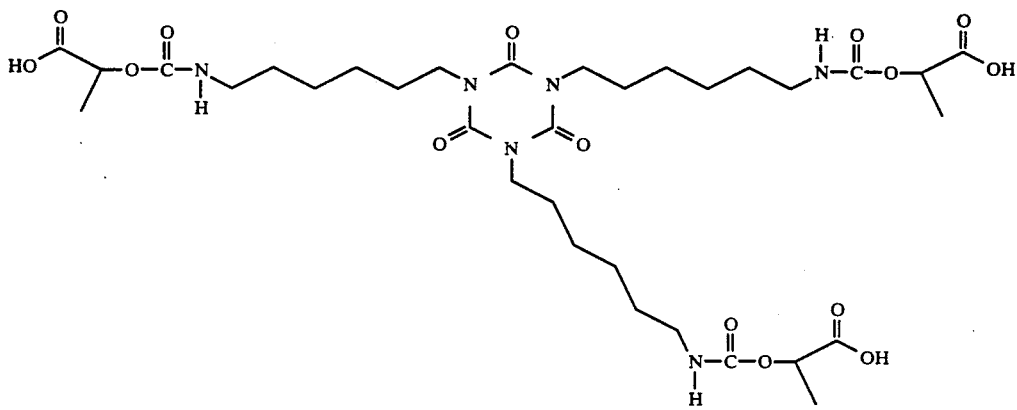

and substituted phenols where the substituents do not adversely affect the coating operations including cresol, nitrophenol, chlorophenol and t-butyl phenol. Also suitable are dibutyl amine and tertiary hydroxyl amines such as diethylethanolamine.

The crosslinkers of the present invention are formed by reacting sufficient quantities of organic polyisocyanates, with sufficient quantities of blocking agent, at a sufficient temperature, for a sufficient amount of time, under reaction conditions conventional in the art, such that no free isocyanate groups are present when the reaction has run its course.

The crosslinker(s) utilized in the present invention have two or more functional groups (i.e. reactive crosslinker functionalities) thereon that react with the functional groups on the polymer molecule. Generally, the blocked crosslinkers are available commercially. The blocked isocyanurate of isophorone diisocyanate is a relatively well known isocyanurate, and is available as Desmodur BL4165, from Miles Corporation of Pittsburgh, Pa. The blocked isocyanurate of hexamethylene diisocyanate is also available from Miles Corporation, as Desmodur BL3175.

The mixture of a first blocked crosslinker and a second blocked crosslinker in the one component composition can be described in terms of an "equivalents ratio". The phrase "equivalents ratio", as applied to the first crosslinker and the second crosslinker, represents the ratio of the equivalents of reactive functional groups (i.e. —NCO— groups) present on the first crosslinker to the equivalents of reactive functional groups (i.e. —NCO— groups), present on the second crosslinker. For example, for an equivalents ratio of 99:1, 99 percent of the functional groups are located on the first crosslinker(s) and only 1 percent of the functional groups are present on the second crosslinker(s). Generally, the mixture contains an equivalents ratio of first crosslinker to second crosslinker of from about 99:1 to about 1:99. Preferably the first crosslinker is blended with the second crosslinker in an equivalents ratio of from about 90:10, respectively, to about 60:40, respectively.

The composition of the present invention further comprises a film forming polymer. The film forming polymer preferably includes at least one member selected from the group consisting of an acrylic polymer, a polyurethane polymer, a polyester polymer and a polyamide polymer. The film forming polymer has thereon at least one functional group that is reactive with the crosslinker, i.e., a "reactive polymer functionality." The reactive functional group present on the polymer (i.e., the reactive polymer functionality) may be any functional group that is reactive with the functional group present on the crosslinker(s). Preferably the functional group present on the polymer is at least one functionality selected from the group consisting of a hydroxyl functionality, an amine functionality, an epoxy functionality, a carboxylic acid functionality and an anhydride functionality. More preferably the functional group present on the polymer is at least one functionality selected from the group consisting of a hydroxyl functionality and an amine functionality.

The film forming polymer present in the composition of the present invention may, in general, have a glass transition temperature (Tg) which, in combination with the Tg of the crosslinker and the equivalent weight of the polymer, results in the production of a film having a desired hardness. Preferably the polymer has a glass transition temperature of from about 15° C. to about 65° C. More preferably, the polymer has a glass transition temperature of from about 20° C. to about 40° C.

The equivalent weight of the polymer is based on the weight of reactive functionality present on the polymer (e.g. —NH— or —OH—) per equivalent of reactive functionality on the crosslinking agent (e.g. —NCO—). The film forming polymer present in the composition of the present invention may, in general, have any equivalent weight (based on the equivalents of reactive functionality present on the polymer) that corresponds with an overall crosslinking density high enough that film forming properties result. Generally, the polymer has an equivalent weight, based on the equivalents of reactive functionality present on the polymer, of from about 217 grams per equivalent to about 651 grams per equivalent. Preferably, the polymer has an equivalent weight of from about 302 grams per equivalent to about 413 grams per equivalent.

The mixture of crosslinker and polymer can also be described in terms of "equivalents ratio". This ratio represents the ratio of the equivalents of reactive functional groups present on the crosslinker(s) to the equivalents of reactive functional groups present on the polymer. Preferably, the composition of the present invention comprises the blend of crosslinkers and polymer in an equivalents ratio, based on a ratio of crosslinker reactive functionality to polymer reactive functionality, of from about 0.6 to about 1.4. The 0.6 ratio, for example, specifies that there are 6 reactive functional cites on crosslinker(s) for every 10 reactive functional cites on the polymer(s). More preferably, the composition of the present invention includes the polymer and a blend of crosslinkers in an equivalents ratio, based on a ratio of crosslinker functionality to polymer functionality, of from about 0.8 to about 1.2.

The composition of the present invention may further include any additional ingredient that imparts any desired characteristic to the composition, to the process, or to the cured coating made therefrom. Such additional ingredients are rheology control agents, leveling agents, catalysts, cure inhibiting agents, anti-yellowing agents, free radical scavengers, melamine, and anti-cratering agents.

In general, the one component composition of the present invention can be opaque or transparent, colored or colorless. The coating composition can be utilized in a process whereby it is a first coating on the substrate, an intermediate coating on the substrate, or an uppermost coating on the substrate. In a preferred embodiment the coating composition is both substantially transparent and substantially colorless. It is utilized in a process where it forms an uppermost coating on the substrate, i.e., it is exposed directly to the environment. In this embodiment, the coating composition of the present invention is used to form a coating layer over a basecoat layer. This embodiment is particularly useful to form an automotive quality clearcoat over an automotive quality basecoat. For automotive applications the basecoat is usually positioned over one or more additional coatings, such as one or more primer coatings, one or more anti corrosion coatings, and one or more adhesion promoting coatings. These additional coatings are usually positioned directly against a metal substrate that is suited for use as an automotive body panel.

The process of the present invention minimizes or eliminates yellowing of the cured coating composition by carefully controlling the curing temperature. The process includes the steps of: a) applying the one component composition described herein above to a substrate so that the substrate is coated with a film of the composition; and b) curing the film on the substrate by heating the film-coated substrate within a carefully controlled temperature range of between about 135° C. and about 155° C., to prevent yellowing of the cured film. Optimal results for minimizing yellowing and maximizing etch resistance are achieved with curing temperatures of between about 143° C. and about 150° C. The substrate can be any substrate onto which a coating formulation can be applied and cured. Usually the substrate is metallic or polymeric, although the substrate may be amorphous (e.g., glass). Preferably, the substrate is a metallic or polymeric panel suitable for the use as an automotive body panel.

During the curing process the reactive functionality on the isocyanate crosslinker reacts with the reactive functionality on the polymer to form a crosslinked polymeric network. The occurrence of the crosslinking reaction is evidenced by the presence of at least one residue of a polymeric reactant, and at least one residue of a crosslinker reactant. The term "residue", as used herein, refers to that portion of a reactant that remains as a group or monomer in the crosslinked network after the crosslinking reaction. The residue is derived form the named reactant (e.g., a polymeric residue is a residue of a polymer reactant, as found in the crosslinked network). Thus, residues of both at least one polymer and at least one crosslinker are present in the crosslinked network. The polymeric residue may, in general, be the residue of any polymer that was a reactant in a crosslinking reaction with a crosslinker. The polymers are as described above in the summary and detailed description of the composition of the present invention.

The crosslinker residue may, in general, be the residue of any first crosslinker that was a reactant in a crosslinking reaction with a polymer reactant. Preferably the cured coating of the present invention further includes a second crosslinker residue. The second crosslinker residue may, in general, be the residue of any second crosslinker that was a reactant in a crosslinking reaction with a polymer reactant. The first and second crosslinkers are as described above in the summary and detailed description of the composition of the present invention.

Although the following Examples 1 and 2 illustrate different embodiments of the present invention, the present invention is not limited to or by these examples.

EXAMPLE 1

Into a suitable container were added 46.66 parts by weight of (1) an acrylic that: (a) had a glass transition temperature (Tg) of about 11° C.; (b) had an equivalent weight based on hydroxyl functionality of about 333 grams per equivalent; and (c) was about 65% by weight solid material. This acrylic is hereinafter referred to as "Acrylic 1". To the same container containing acrylic 1 were added:

(2) 6.88 parts by weight of methyl amyl ketone, a solvent purchased from Ashland Chemicals;

(3) 6.87 parts by weight of exxate 800, a solvent purchased from Exxon Corporation;

(4) 0.22 parts by weight of Byk 306, a silane additive purchased from Byk Chemie;

(5) 2.20 parts by weight of Tinuvin 1130, an ultraviolet light absorber purchased from Ciba-Geigy Corporation;

(6) 0.82 parts by weight of Tinuvin 292, a hindered amine light stabilizer purchased from Ciba-Geigy Corporation, (7) 21.70 parts by weight of Desmodur BL4165, a blocked isocyanurate of isophorone diisocyanate, purchased from Miles Corporation, of Pittsburgh, Pa.;

(8) 9.32 parts by weight of Desmodur BL3175, a blocked isocyanurate of hexamethylene diisocyanate purchased from Miles Corporation of Pittsburgh, Pa.;

(9) 5.05 parts by weight of Resimene 750, a melamine purchased from Monsanto Corporation; and

(10) 0.28 parts by weight of Dibutyl Tin Diacetate, purchased from Air Products.

The mixture of (1)–(10) was stirred was together for a period of about 30 minutes, to achieve uniformity. The mixture is hereinafter referred to as "clearcoat 1".

Clearcoat #1 was sprayed using a Binks model 62 air atomized siphon spray gun. The spray was directed over a cold rolled steel panel (code #APR16392). The cold rolled steel panel was purchased from Advanced Coating Technologies, Inc., that had been sprayed with a suitable colored basecoat composition. The resulting spray panel was then baked for 30 minutes at 290° F.(143.3° C.), in a gas fired oven, serial no. 145335, purchased from Despatch Industries, Inc.

Data for Clearcoat #1 is recorded in Table 1, relating to gloss, distinctness of image, stability in ultraviolet light, hardness and environmental etch performance. Good results were obtained for all of these characteristics.

EXAMPLE 2

Into a suitable container were added 45.61 parts by weight of (1) an acrylic that: (a) had a glass transition temperature (Tg) of about 25 C.; (b) had an equivalent weight based on hydroxyl functionality of about 333 grams per equivalent; and (c) was about 65% by weight solid material. This acrylic is hereinafter referred to as "Acrylic 2". To the same container containing acrylic 2 were added:

(2) 6.81 parts by weight of methyl amyl ketone, a solvent purchased from Ashland Chemicals of Columbus, Ohio;

(3) 6.81 parts by weight of exxate 800, a solvent purchased from Exxon Corporation;

(4) 0.22 parts by weight of a Byk 306, a silane additive purchased from Byk Chemie of Detroit, Mich.;

(5) 2.18 parts by weight of Tinuvin 1130, an ultraviolet light absorber purchased from Ciba-Geigy Corporation of Hawthorne, N.Y.; and (6) 0.82 parts by weight of Tinuvin 292, a hindered amine light stabilizer purchased from Ciba-Geigy Corporation;

(7) 28.64 parts by weight of Desmodur BL4165, a blocked isocyanurate of isophorone diisocyanate, purchased from Miles Corporation of Pittsburgh, Pa.;

(8) 3.69 parts by weight of Desmodur BL3175, a blocked isocyanurate of hexamethylene diisocyanate purchased from Miles Corporation of Pittsburgh, Pa.;

(9) 4.94 parts by weight of Resimene 750, a melamine purchased from Monsanto Corporation; and

(10) 0.27 parts by weight of Dibutyl Tin Diacetate, purchased from Air Products. The mixture of (1)–(10) was stirred was together for a period of about 30 minutes. The mixture is hereinafter referred to as "clearcoat 2".

Clearcoat #2 was sprayed using a Binks model 62 air atomized siphon spray gun. The spray was directed over a cold rolled steel panel (code #APR16392). The cold rolled steel panel was purchased from Advanced Coating Technologies, Inc.

The steel panel had already been sprayed with a suitable colored basecoat composition. The resulting spray panel was then baked for 30 minutes at 290° F. (143.3° C.), in a gas fired oven, serial no. 145335, purchased from Despatch Industries, Inc.

Data for Clearcoat #2 relating to gloss, distinctness of image, stability in ultraviolet light, hardness and environmental etch performance is recorded in Table 1. The Clearcoat 2 composition demonstrated results comparable to those of Clearcoat 1 for gloss, distictness of image, hardness and resistance to environmental etch. Clearcoat 2 was less resistant to cracking when exposed to radiation from an FS-40 bulb positioned in QUV tester Model #83-1779-24.

TABLE 1

| CLEARCOAT | ACRYLIC | EQ* % CROSS-LINKER | | GLOSS[1] | DOI[2] | QUV[3] | HARDNESS[4] | ETCH[5] |
| | | IPDI | HMDI | | | | | |
| --- | --- | --- | --- | --- | --- | --- | --- | --- |
| 1 | 1 | 63 | 37 | 82 | 92 | 4000 | 11.0 | 7.0 |
| 2 | 2 | 85 | 15 | 81 | 93 | 2500 | 12.0 | 6.0 |

*EQ % = Equivalent % of the blocked isocyanurate.
[1]Gloss was measured with a gloss meter (Catalog No. 4352) supplied by Byk-Gardner Inc. of Silver Spring, Maryland.
[2]Distinctness of Image (DOI) was measured with ATI DOI Meter (Model No. 1792) from ATI Systems Inc. of Madison Heights, Michigan.
[3]A coated panel was exposed to radiation emitted from an FS-40 bulb positioned in QUV tester Model #83-1779-24, obtained from Q-Panel Company of Cleveland, Ohio. The numbers provided in Table 1 represent hours of exposure before cracking of the coating was visually detectable.
[4]The hardness of the coating was measured using a Microhardness Tester obtained from Page-Wilson Corporation of Bridgeport, Connecticut.
[5]Etch resistance ratings were measured visually on a scale of 1 to 10. A rating of 10 represents severe etching. For both examples 1 and 2, the environmental etch resistance ratings were measured after exposing 10" × 10" coated steel panel to direct sunlight in Jacksonville, Florida for three months.

What is claimed is:

1. A liquid one-component composition suitable for coating a substrate, the composition comprising:
   A. a crosslinker including at least one member selected from the group consisting of blocked isocyanurates of isophorone diisocyanate, and blocked derivatives of isocyanurates of isophorone diisocyanate, blocked biurets of isophorone diisocyanate and blocked derivatives of biurets of isophorone diisocyanate;
   wherein the crosslinker has at least one reactive functionality, and
   B. a film forming polymer having at least one functionality reactive with the crosslinker functionality,
   wherein the resultant coating composition provides excellent resistance to environmental etch.

2. The composition as defined in claim 1, including at least a first crosslinker as defined in claim 1 and further comprising (C) a second crosslinker, the second crosslinker including at least one member selected from the group consisting of
   blocked isocyanurates of hexamethylene diisocyanate, blocked derivatives of isocyanurates of hexamethylene diisocyanate, blocked biurets of hexamethylene diisocyanate, and blocked derivatives of biurets of hexamethylene diisocyanate,
the second crosslinker having at least one reactive functionality, wherein the ratio of equivalents of first crosslinker reactive functionality to equivalents of second crosslinker reactive functionality is from about 99:1 to about 1:99.

3. The composition as defined in claim 2, wherein the first crosslinker is present in mixture with the second crosslinker in an equivalents ratio of from about 90:10 to about 65:35.

4. The composition as defined in claim 2, wherein the film forming polymer includes at least one member selected from the group consisting of an acrylic polymer, a polyurethane polymer, a polyester polymer, and a polyamide polymer.

5. The composition as defined in claim 2, wherein the film forming polymer includes at least one member selected from the group consisting of acrylic polymer and polyurethane polymer.

6. The composition as defined in claim 2, wherein the reactive polymer functionality is selected from the group consisting of a hydroxyl functionality, an amine functionality, an epoxy functionality, a carboxylic acid functionality and an anhydride functionality.

7. The composition as defined in claim 2, wherein the polymer has a glass transition temperature of from about 15° C. to about 65° C.

8. The composition as defined in claim 2, wherein the polymer has a glass transition temperature of from about 20° C. to about 40° C.

9. The composition as defined in claim 2, wherein the polymer has an equivalent weight, based on the reactive polymer functionality present on the polymer, of from about 217 grams per equivalent to about 651 grams per equivalent.

10. The composition as defined in claim 2, wherein the polymer has an equivalent weight, based on the reactive polymer functionality present on the polymer, of from about 302 grams per equivalent to about 413 grams per equivalent.

11. The composition as defined in claim 2, wherein the composition comprises the blend of crosslinkers and the polymer in an equivalents ratio, based on a ratio of reactive crosslinker functionalities to reactive polymer functionality, of from about 0.6 to about 1.4.

12. The composition as defined in claim 2, wherein the composition comprises the blend of crosslinkers and the polymer in an equivalents ratio, based on a ratio of reactive crosslinkers functionality to reactive polymer functionality, of from about 0.8 to about 1.2.

13. The composition as defined in claim 2, wherein the film forming polymer includes at least one member selected from the group consisting of acrylic polymer, polyurethane polymer, polyester polymer, and polyamide polymer, the film forming polymer including at least one functionality selected from the group consisting of hydroxyl, amine, epoxy, carboxylic acid and anhydride functionalities, and having a glass transition temperature of from about 15° C. to about 65° C., and having an equivalent weight, based upon reactive polymer functionality, of from about 217 grams per equivalent to about 651 grams per equivalent, and wherein the composition comprises the polymer and the blend of crosslinkers in an equivalents ratio of reactive polymer functionality to reactive crosslinker functionalities, of from about 0.6 to about 1 and the composition is substantially transparent.

14. A process for coating a substrate, the process comprising:
   A. applying a liquid one component coating composition to a substrate to form a film on the substrate, the composition having
      1. a crosslinker including at least one member selected from the group consisting of blocked isocyanurates of isophorone diisocyanate, blocked derivatives of isocyanurates of isophorone diisocyanate, blocked biurets of isophorone diisocyanate, and blocked derivatives of blocked biurets of isophorone diisocyanate;
      2. a film forming polymer having at least one functionality thereon reactive with the crosslinker; and
   B. curing the film of the one component composition on the substrate by heating the film-coated substrate to a temperature of between about 135° C. and about 147° C., to produce a cured coating, wherein the resultant cured coating provides excellent resistance to environmental etch.

15. The process as defined in claim 14, wherein the step of applying the composition to a substrate includes a composition having at least a first crosslinker as defined in claim 14, and further comprises a second crosslinker, the second crosslinker including at least one member selected from the group consisting of blocked isocyanurates of hexamethylene diisocyanate, blocked derivatives of isocyanurates of hexamethylene diisocyanate, blocked biurets of hexamethylene diisocyanate, and blocked derivatives of biurets of hexamethylene diisocyanate, wherein the composition is a substantially transparent composition.

16. The process as defined in claim 15, wherein step of applying the one coat composition includes a composition having at least one film forming polymer selected from the group consisting of an acrylic polymer, a polyurethane polymer, a polyester polymer, and a polyamide polymer, and wherein the film forming polymer includes at least one functionality selected from the group consisting of hydroxyl, amine, epoxy, carboxylic acid and anhydride functionalities, and wherein the film forming polymer has a glass transition temperature of from about 15° C. to about 65° C., and wherein the film forming polymer has an equivalent weight, based upon reactive polymer functionality, of from about 217 grams per equivalent to about 651 grams per equivalent, and wherein the composition comprises the polymer and the blend of crosslinkers in an equivalents ratio of reactive polymer functionality to reactive crosslinker functionalities, of from about 0.6 to about 1.0.

17. A cured coating on a substrate, wherein the cured coating comprises a crosslinked polymeric network, wherein the crosslinked polymeric network includes
   1. at least one crosslinker residue selected from the group consisting of:
      a residue of a blocked isocyanurate of isophorone diisocyanate,
      a residue of a blocked derivative of a isocyanurate of isophorone diisocyanate,
      a residue of a blocked biuret of isophorone diisocyanate,
      a residue of a blocked derivative of a biuret of isophorone diisocyanate,
   wherein the crosslinker residue wherein the crosslinker has at least one reactive functionality, and
   2. at least one polymeric residue selected from the group consisting of
      a residue of an acrylic polymer,
      a residue of a polyurethane polymer,
      a residue of a polyester polymer,
      a residue of a polyamide polymer;
   the polymeric residue having at least one functionality reactive with the crosslinker functionality, wherein the resultant cured coating provides excellent resistance to environmental etch.

18. The cured coating as defined in claim 17, wherein the cured coating includes at least one first crosslinker residue as defined in claim 18, and further comprises at least one second crosslinker residue selected from the group consisting of
   a residue of a blocked isocyanurate of hexamethylene diisocyanate,
   a residue of a blocked derivative of isocyanurates of hexamethylene diisocyanate,
   a residue of a blocked biuret of hexamethylene iisocyanate and
   a residue of a blocked derivative of biurets of hexamethylene diisocyanate,
the second crosslinker having at least one reactive functionality, wherein the ratio of equivalents of first crosslinker functionality and second crosslinker functionality is from about 99:1 to about 1:99.

19. The cured coating as defined in claim 18, wherein the polymeric residue includes at least one member selected from the group consisting of a residue of an acrylic polymer and a residue of a polyurethane, and the first crosslinker residue includes a residue of a blocked isocyanurate of isophorone diisocyanate, and the second crosslinker includes a residue of a blocked isocyanurate of hexamethylene diisocyanate, and wherein an equivalents ratio of the residue of the first crosslinker to the second crosslinker is from about 90:10 to about 60:40 respectively, and the cured coating is a substantially transparent coating.

20. The process of applying a one-component composition to a substrate as defined in claim 14, wherein the one component composition is the clearcoat of a color-plus-clear composite coating.

21. The process of applying a one-component composition to a substrate as defined in claim 15, wherein the one component composition is the clearcoat of a color-plus-clear composite coating.

22. The process of applying a one-component composition to a substrate as defined in claim 16, wherein the coating is the clearcoat of a color-plus-clear composite coating.

23. The process of applying a one-component composition to a substrate as defined in claim 17, wherein the coating is the clearcoat of a color-plus-clear composite coating.

24. The process of applying a one-component composition to a substrate as defined in claim 18, wherein the coating is the clearcoat of a color-plus-clear composite coating.

25. The process of applying a one-component composition to a substrate as defined in claim 19, wherein the coating is the clearcoat of a color-plus-clear composite coating.

* * * * *